US011535399B2

(12) United States Patent
Prendergast et al.

(10) Patent No.: US 11,535,399 B2
(45) Date of Patent: Dec. 27, 2022

(54) METHOD AND SYSTEM FOR AIRCRAFT ASSEMBLY AND MAINTENANCE

(71) Applicant: The Boeing Company, Chicago, IL (US)

(72) Inventors: Matthew Lee Prendergast, Covington, WA (US); Nicholas J. Brimlow, Sammamish, WA (US); Arthur Eugene Whitson, Jr., Bainbridge Island, WA (US); Charles Michael Richards, Kent, WA (US); William Scott Ballantine, Sammamish, WA (US); James T. Johnstone, Burien, WA (US)

(73) Assignee: The Boeing Company, Chicago, IL (US)

(*) Notice: Subject to any disclaimer, the term of this patent is extended or adjusted under 35 U.S.C. 154(b) by 172 days.

(21) Appl. No.: 16/897,177

(22) Filed: Jun. 9, 2020

(65) Prior Publication Data
US 2021/0380279 A1 Dec. 9, 2021

(51) Int. Cl.
*B64F 5/10* (2017.01)
*B64F 5/40* (2017.01)
*B66F 11/04* (2006.01)
*E04G 3/28* (2006.01)

(52) U.S. Cl.
CPC ............ *B64F 5/10* (2017.01); *B64F 5/40* (2017.01); *B66F 11/04* (2013.01); *E04G 3/28* (2013.01)

(58) Field of Classification Search
CPC .... B64F 5/10; B64F 5/40; B66F 11/04; E04G 3/28
See application file for complete search history.

(56) References Cited

U.S. PATENT DOCUMENTS

| 2,362,991 | A | * | 11/1944 | Dahl | B64F 1/22 414/427 |
| 4,657,112 | A | * | 4/1987 | Ream | B66F 11/04 52/118 |
| 8,251,177 | B2 | * | 8/2012 | Watt | B66F 11/04 182/64.1 |
| 10,974,396 | B2 | * | 4/2021 | Bartlett | B64F 5/40 |

(Continued)

FOREIGN PATENT DOCUMENTS

| KR | 101912178 B1 * | 10/2018 | ......... E04G 21/3204 |
| WO | WO-9941186 A1 * | 8/1999 | ............. B66F 11/04 |
| WO | WO-2006129129 A2 * | 12/2006 | ............. B66F 11/04 |

OTHER PUBLICATIONS

Yoo Nam Ho; Safety handrail with foldable two-stage structure; Oct. 26, 2018; EPO English Machine Translation, pp. 1-6 (Year: 2018).*

(Continued)

*Primary Examiner* — Bayan Salone
(74) *Attorney, Agent, or Firm* — Kolisch Hartwell, P.C.

(57) ABSTRACT

Methods of performing assembly or maintenance on an aircraft, systems for performing desired assembly or maintenance on an aircraft, and mobile work stations useful for such systems and methods, where the mobile work stations include a work platform, including an accessway providing access to the work platform; and a moveable base supporting the work platform with one or more platform jacks that can adjustably raise and lower the work platform.

22 Claims, 10 Drawing Sheets

(56) References Cited

U.S. PATENT DOCUMENTS

| | | | |
|---|---|---|---|
| 2008/0196977 A1* | 8/2008 | Watt | E04G 1/22 |
| | | | 187/243 |
| 2009/0057636 A1* | 3/2009 | Davis | A63J 1/02 |
| | | | 254/89 H |
| 2019/0077645 A1* | 3/2019 | Conway | B66F 17/006 |
| 2019/0389078 A1* | 12/2019 | Bartlett | B25J 5/007 |

OTHER PUBLICATIONS

Eaton's Crouse-Hinds Business, "Arktite Circuit Breaking CPS Receptacles and CPP Plugs" retrieved from www.cooperindustries.com/content/dam/public/crousehinds/industrial-products/catalog-pdfs/pr/arktite-cpp-cps-plugs-receptacles.pdf on Jun. 9, 2020, 4 pages, 2013.

Nautica Expo, "Yacht Ladder / Lateral / Boarding / Manual" retrieved from www.nauticexpo.com/prod/besenzoni-spa/product-21536-284668.html on Jun. 9, 2020, 9 pages.

New Wave Fabrication, "Tide Rider Boarding Stairs" retrieved from www.newwavefab.com/tide-rider-stairs/ on Jun. 9, 2020, 2 pages.

New Wave Fabrication, "Boarding Stairs" retrieved from www.newwavefab.com/wp-content/uploads/hmpg_yacht_strs_1-21.pdf on Jun. 9, 2020, 1 page.

Eaton, "Eaton's B-Line Series Safety Gratings" retriived from www.cooperindustries.com/content/dam/public/bline/Resources/Library/catalogs/safety_gratings/traction_tread/GSMTT-13R.pdf on Jun. 9, 2020, 10 pages.

H&D Molding Incorporated, "Foam Bumpers/Headknockers" retrieved from www.hdmolding.com/pdf/Catalog1.pdf on Jun. 9, 2020, 6 pages.

* cited by examiner

METHOD AND SYSTEM FOR AIRCRAFT ASSEMBLY AND MAINTENANCE

FIELD

This disclosure relates to the performance of maintenance on aircraft, and more particularly, the disclosure relates to work platforms to facilitate the performance of maintenance on aircraft.

INTRODUCTION

Service and maintenance operations on commercial or military aircraft have typically required the use of a hanger. The hanger can provide shelter for the technicians and mechanics working on the aircraft from wind and weather, as well as permitting control of who can access the aircraft and observe the service and maintenance operations. Additionally, aircraft service and maintenance has traditionally required the use of one or more overhead cranes to lift heavy and/or bulky aircraft components and align them properly for installation.

This reliance on enclosed hangers creates troublesome limitations for aircraft service. Where hanger space is limited, aircraft must wait for a space to become available, delaying service and maintenance operations. Even more problems occur when the aircraft to be serviced is grounded at a location that has no hanger facilities in which to park the aircraft, such as after an unplanned landing, or at a remote airbase during military operations.

In addition, the reliance on overhead cranes for component positioning can create an occasionally hazardous work environment, where heavy components can swing unpredictably and strike workers, or pinch a worker's hand between the component and the aircraft, as well as creating an inherent hazard whenever a worker passes beneath a suspended component. An alternative to the overhead crane could therefore improve operations within hangers as well, such as aircraft assembly.

SUMMARY

The present disclosure provides methods of performing assembly or maintenance on an aircraft, systems for performing desired assembly or maintenance on an aircraft, and mobile work stations useful for such systems and methods.

In some examples, the present disclosure relates to methods of performing desired assembly or maintenance on an aircraft, the methods including positioning a mobile work station adjacent the aircraft, where the mobile work station includes a work platform including an accessway providing access to the work platform, and a base supporting the work platform with one or more platform jacks that can adjustably raise and lower the work platform, and including a plurality of wheels that permit the mobile work station to be positioned adjacent the aircraft; stabilizing and/or leveling the mobile work station by deploying one or more jack stands of the wheeled base; aligning the work platform with an exterior structure to be serviced on the aircraft with the one or more platform jacks; performing the desired maintenance on the exterior structure to be serviced from the work platform; moving the mobile work station away from the aircraft; and lowering the work platform on the base using the one or more platform jacks.

In some examples, the present disclosure relates to systems for performing desired maintenance on an aircraft, the systems including a mobile work station that has a work platform including an accessway providing access to the work platform, and a wheeled base supporting the work platform with one or more platform jacks that can adjustably raise and lower the work platform.

In some examples, the present disclosure relates to mobile work stations, where the mobile work station includes a work platform having a side structure on each of two opposing sides, a roof structure coupled to each of the two side structures, and lowerable guard rails on each of two opposing open sides; and a wheeled base supporting the work platform with one or more platform jacks to adjustably raise and lower the work platform; and one or more jack stands to level and/or stabilize the mobile work station by leveling and/or stabilizing the wheeled base.

Features, functions, and advantages can be achieved independently in various examples of the present disclosure, or can be combined in yet other examples, further details of which can be seen with reference to the following description and drawings.

DETAILED DESCRIPTION

Figure 1:
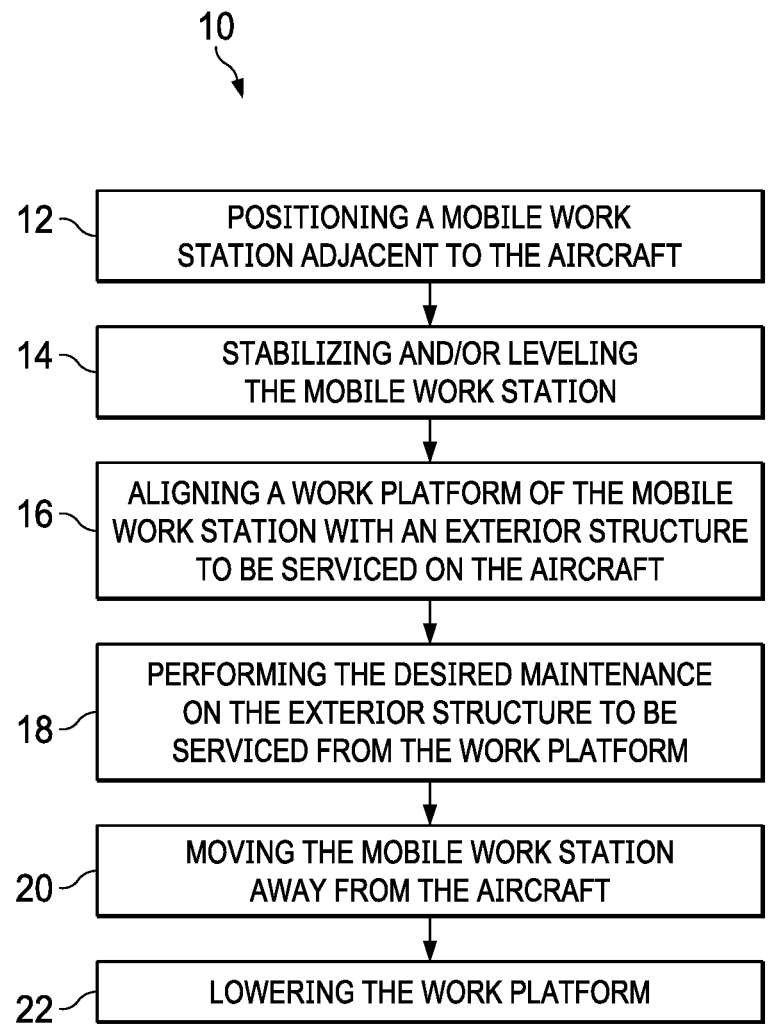
FIG. 1 is a flowchart depicting an illustrative method of performing desired assembly or maintenance on an aircraft, according to the present disclosure.

Various methods, systems, and work platforms for aircraft assembly and maintenance are described below and illustrated in the associated drawings. Unless otherwise specified, the methods, systems, and work platforms may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed examples. The following description of various examples is merely illustrative in nature and is in no way intended to limit the examples, their applications, or their uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion.

(1) Definitions

The following definitions apply herein, unless otherwise indicated.

"Aircraft assembly" means combining one or more aircraft components as part of the manufacture of an aircraft or an aircraft subsystem.

"Maintenance" includes any and all aspects of maintenance, repair, and overhaul (MRO) of an aircraft. Aircraft maintenance includes the performance of any tasks required to ensure the continuing airworthiness of the aircraft, aircraft subsystem, or aircraft part; including overhaul, inspection, replacement, defect rectification, disassembly, modification, ensuring airworthiness, and repair, without limitation.

"Coupled" means to be in such relation that the performance of one influences the performance of the other, may include being connected, either permanently or releasably, whether directly or indirectly through intervening components, and is not necessarily limited to physical connection(s).

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

(2) Overview

The present disclosure is directed to a method of performing assembly or maintenance on an aircraft using a mobile work station. A representative example of such a method is illustrated by flowchart 10 of FIG. 1. The method can include positioning a mobile work station adjacent to the aircraft, as shown at step 12 of flowchart 10; stabilizing and/or leveling the mobile work station, as shown at step 14 of flowchart 10; aligning a work platform of the mobile work station with an exterior structure to be serviced on the aircraft, as shown at step 16 of flowchart 10; performing the desired maintenance on the exterior structure to be serviced from the work platform, as shown at step 18 of flowchart 10; moving the mobile work station away from the aircraft, as shown at step 20 of flowchart 10; and lowering the work platform, at step 22 of flowchart 10.

(3) Examples, Components, and Alternatives

The method of flowchart 10 can be efficiently performed by employing a system 24 for performing assembly or maintenance on an aircraft 26 that includes a mobile work station 30, where mobile work station 30 is configured to facilitate carrying out assembly or maintenance operations on aircraft 26.

Figure 2:
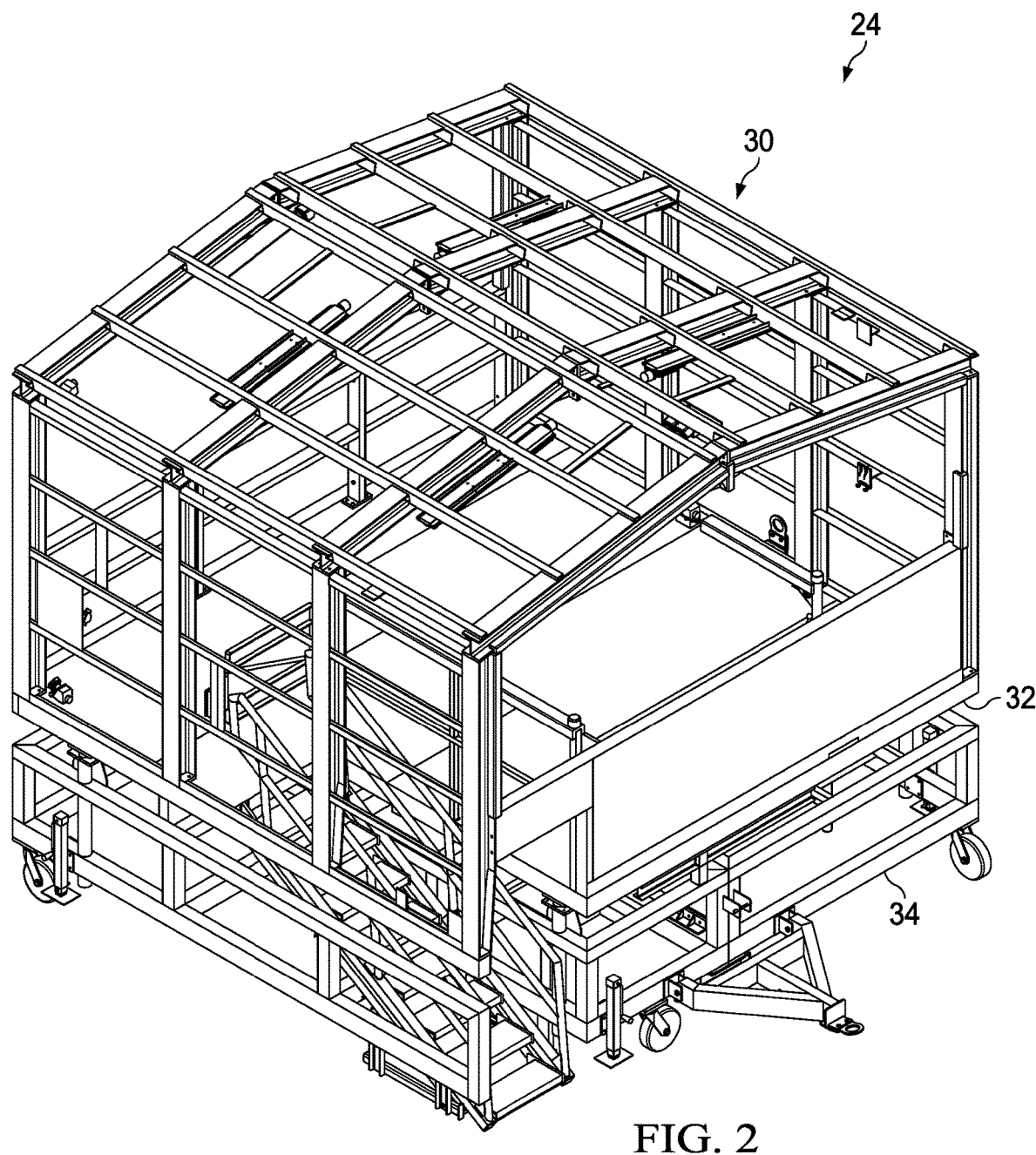
FIG. 2 depicts an illustrative mobile work station, according to the present disclosure.
Figure 3:
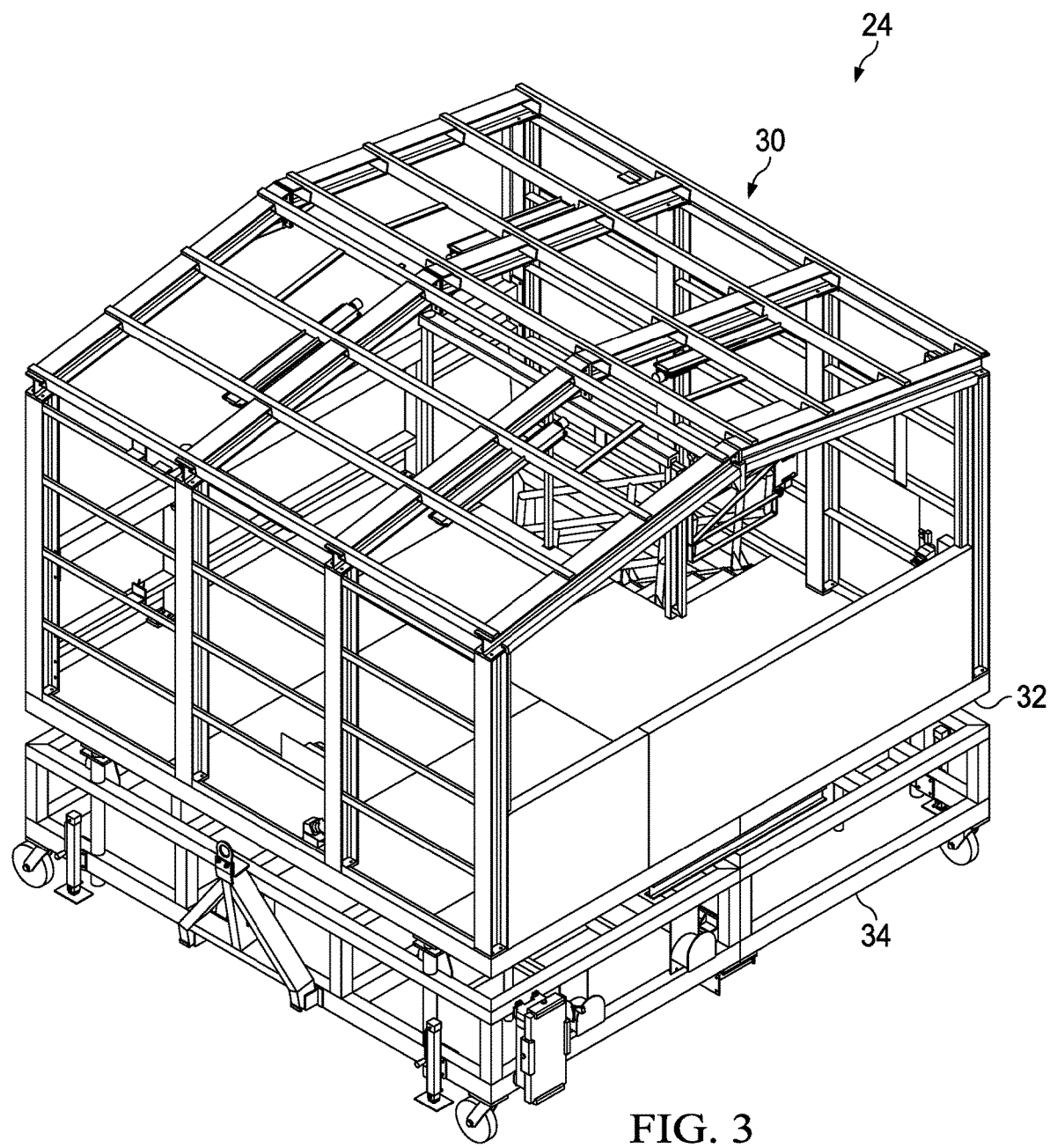
FIG. 3 depicts the mobile work station of FIG. 2 from an alternative viewpoint.

A representative mobile work station 30 that can be effectively utilized in a system 24 for carrying out the method of flowchart 10 is depicted in FIGS. 2 and 3 and includes a work platform 32 supported by a moveable base 34.

Figure 4:
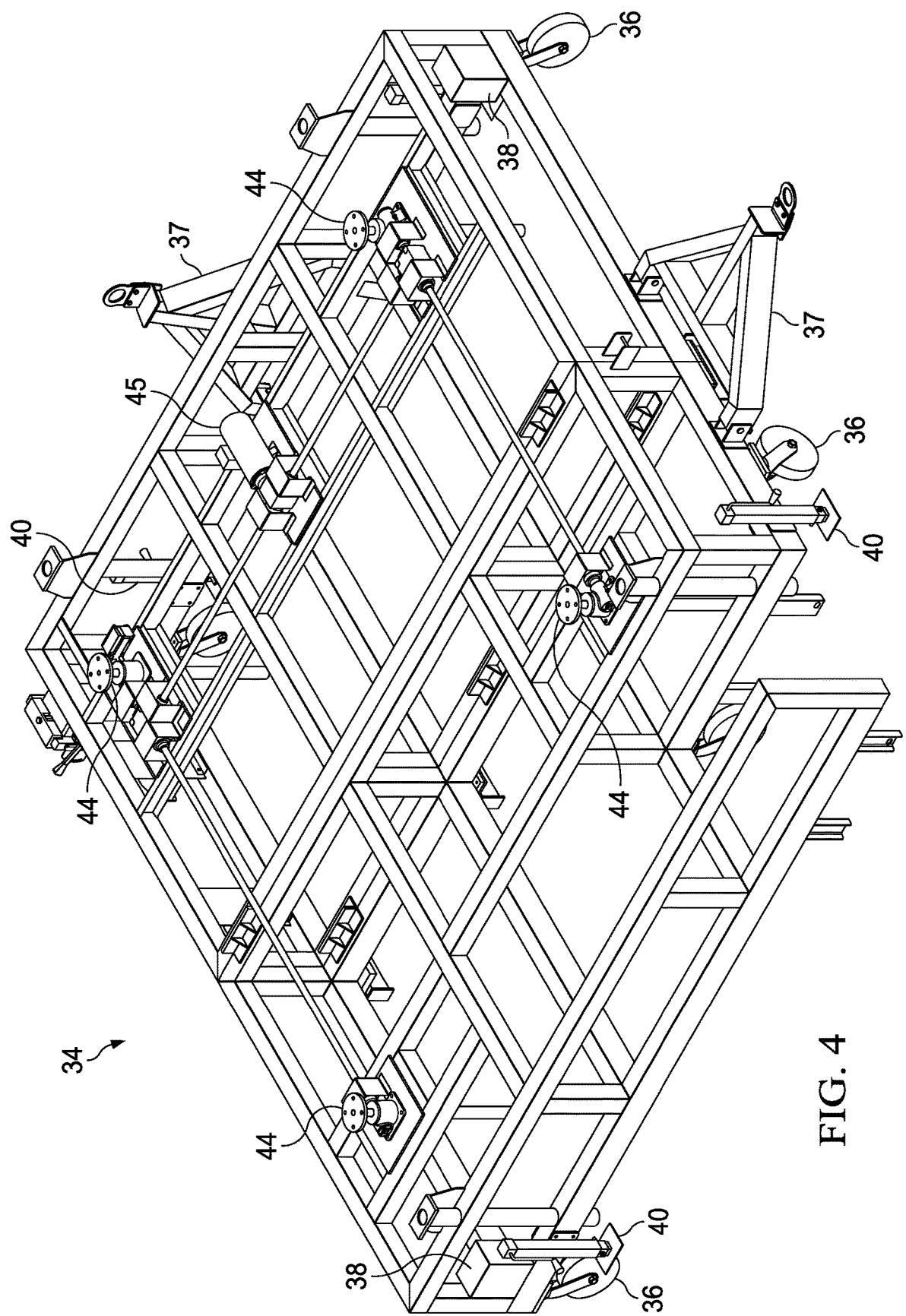
FIG. 4 depicts the moveable base of the mobile work station of FIG. 2.
Figure 5:
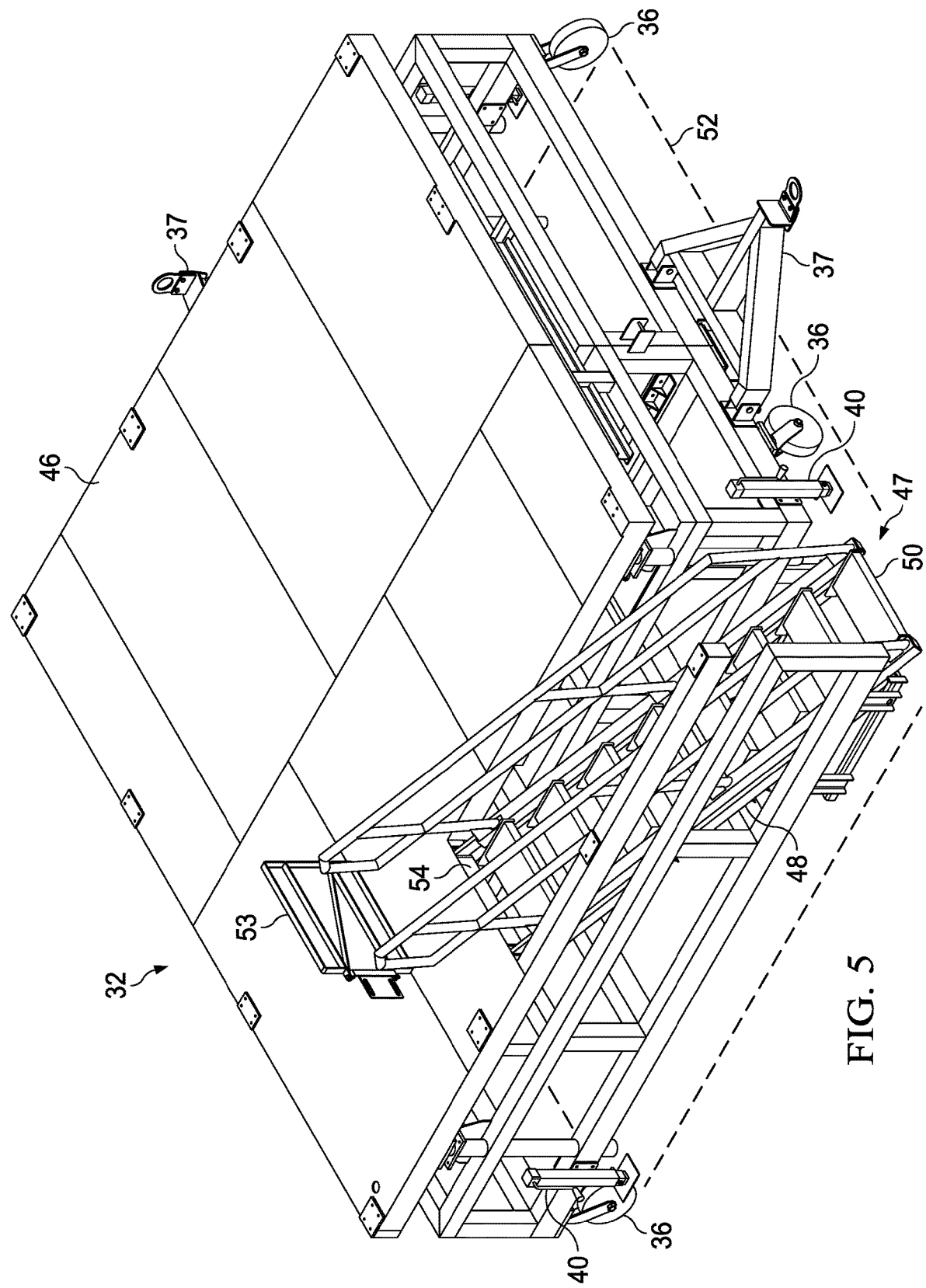
FIG. 5 depicts the moveable base and a portion of the work platform of the mobile work station of FIG. 2.

Moveable base 34 can support and stabilize work platform 32, and may additionally include an apparatus to enable movement of mobile work station 30. Although moveable base 34 can include one or more wheels 36 configured so that moveable base 34 can moved using wheels 36, any other apparatus that facilitates moving moveable base 34 is an appropriate apparatus for the present disclosure. For example, moveable base 34 can include one or more continuous tracks, that can be powered or unpowered.

Where moveable base 34 includes a plurality of unpowered wheels 36, as shown in FIG. 4, moveable base 34 can include an interface to connect to a propulsion means, such as deployable hitch 37. Deployable hitch 37 can be stored in an upright configuration, making the hitch mechanism less obtrusive, and then pivoted to a horizontal configuration, facilitating the use of hitch 37 to tow, push, or otherwise propel moveable base 34, such as with a tractor, a motor vehicle, or an aircraft tug that is typically used for the ground movement of aircraft.

Moveable base 34 can optionally include a drive mechanism for driving one or more of wheels 36 so that mobile work station 30 can be self-propelled. Any drive mechanism sized to fit on moveable base 34 and deliver adequate power to wheels 36 is an appropriate drive mechanism for the purposes of the present disclosure. In particular, moveable base 34 can include one or more electric drive mechanisms 38 to supply power directly to wheels 36, as shown in FIG. 4. As shown, one or more wheels 36 can be equipped with a dedicated drive mechanism 38 to supply power to that wheel. As each drive mechanism 38 can be powered individually, moveable base 34 can be maneuvered as desired by differentially powering each drive mechanism 38 to move base 34 in any desired direction.

Once moveable base 34 of mobile work station 30 has been positioned adjacent to aircraft 26 in a desired location, mobile work station 30 can be stabilized and/or leveled by stabilizing and/or leveling moveable base 34. Moveable base 34 can include a plurality of extendable jack stands 40 configured to level and/or stabilize mobile work station 30, so that mobile work station 30 can be deployed safely and effectively even on uneven surfaces, such as on unpaved ground, or on damaged runways.

Jack stands 40, which can also be referred to as outriggers or stabilizers, can include any appropriate mechanical jacks, pneumatic jacks, or hydraulic jacks. Where jack stands 40 include mechanical jacks, such as cylinder jacks or screw jacks, among others, the jack stands can be manually extended and retracted. Alternatively, or in addition, jack stands 40 can be powered jacks and can include hydraulic, pneumatic, or electrical jacks, among others, and the jack stands can be extended and retracted by an operator.

Once mobile work station 30 has been leveled and/or stabilized in a desired location, work platform 32, which is supported by moveable base 34, can be aligned with an exterior structure 42 on aircraft 26 that is to be serviced. Alignment of work platform 32 with exterior structure 42 can be accomplished by energizing one or more platform jacks 44 that couple work platform 32 to moveable base 34, and can be used to adjustably raise and lower work platform 32. Similar to jack stands 40, the platform jacks 44 can include any desired combination of mechanical jacks, hydraulic jacks, pneumatic jacks, and electrical jacks, provided that platform jacks 44 possess sufficient height when fully extended to substantially align work platform 32 with the desired exterior structure 42. as shown in FIG. 4, moveable base 34 can include a platform jack drive 45 to power one or more of platform jacks 44. As shown, platform jack drive 45 can be coupled to each platform jack 44 on moveable base 34. Alternatively, each platform jack 44 can be coupled to an individual and appropriate platform jack drive 45.

Work platform 32 can include a work surface 46 that provides a stable and substantially level horizontal surface upon which personnel performing assembly, repair, or maintenance on aircraft 26 can be supported. Work surface 46 can include any material typically used for work platforms, the composition of work surface 46 can be selected to be one or more of slip-resistant, oil-resistant, flame-resistant, non-sparking, high-strength, and low-weight, among other advantageous characteristics.

Work platform 32 of mobile work station 30 can further include an accessway 47 that provides access to work platform 32. Any accessway that can provide personnel access to work platform 32 from ground level is an appropriate accessway for the purposes of this disclosure, such as a ladder, a ramp, an access stair, or a powered lift. In particular, mobile work station 30 can include an accessway that is an access stair 48. In order to provide safe access to work platform 32 regardless of the particular height to which work platform 32 is raised, access stair 48 can be a self-leveling stair. Further, access stair 48 can be a self-leveling stair configured so that a lower end 50 of access stair 48 remains within a footprint 52 defined by the moveable base 34. That is, no matter the height of work platform 32, lower end 50 of access stair 48 will not extend beyond a perimeter of moveable base 34 (footprint 52).

Access stair 48 can be placed at any position that provides access to work platform 32 of mobile work station 30, but may be advantageously disposed along a one side of work platform 32 and/or moveable base 34. Access stair 48 typically includes one or two handrails/guardrails running along the sides of the stairway, and extending substantially the length of the stairway. Additionally, access stair 48 can include a spring return-type safety gate 53 at the upper end 54 of the stair, in order to help prevent accidents. In particular, safety gate 53 can be configured to swing inward against a side of work platform 32 when opened, then return to its closed position under the urging of the spring return to prevent potential accidents.

Figure 6:
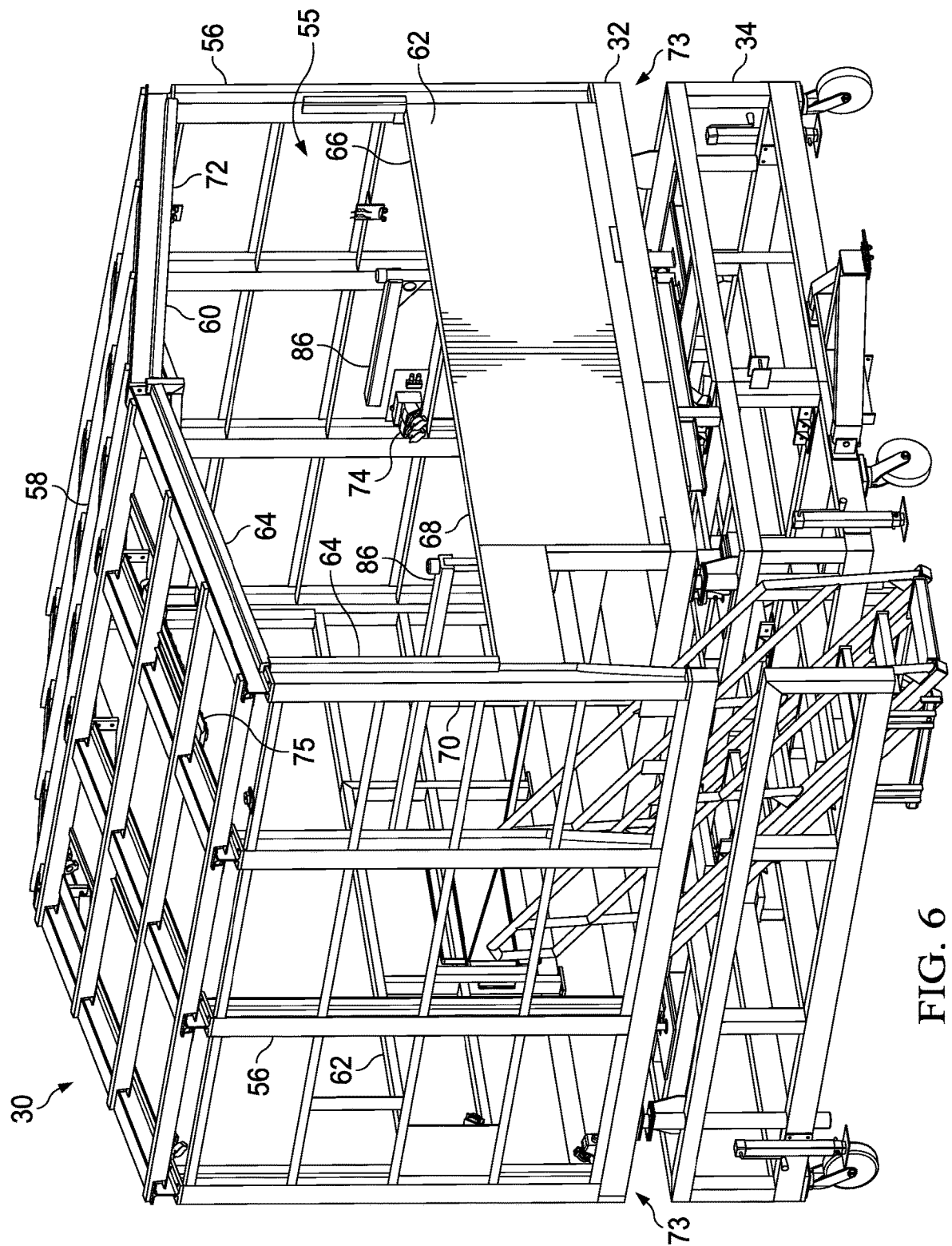
FIG. 6 depicts the mobile work station of FIG. 2

Mobile work station 30 typically includes open access to work platform 32 so as to deliver necessary aircraft components or machinery and/or remove replaced components or machinery. Work platform 32 can be an open platform, particularly where and when the weather conditions are amenable to working outdoors. Alternatively, as shown in FIG. 6, work platform 32 can be at least partially enclosed so as to define a workspace 55 that can provide at least partial shelter from sun, rain, or other inclement weather, and/or to provide privacy or obscure observation of assembly or maintenance procedures. When workspace 55 is at least partially enclosed, workspace 55 can be defined by work platform 32, at least one side structure 56, and a roof structure 57 that is coupled to side structure 56. More typically, workspace 55 can be defined by work platform 32, at least two side structures 56 disposed on each of two opposing sides of the work platform, and a roof structure 57 that is coupled to each of the two side structures 56. Some components of roof structure 57 and side structures 56 are not shown in FIG. so that the structure of mobile work station 30 can be readily understood.

Side structures 56 and roof structure 57 can be solid structures, such as can include a supporting frame 58 and one or more solid exterior panels 59. Alternatively, the side and roof structures can resemble tent structures, by covering the supporting frame 58 with one or more tarps or flexible sheets. Alternatively, or in addition, the side structures 56 and roof structure 57 can incorporate a mixed composition, such as a sold roof structure with fabric sides, for example to promote ventilation.

Where work platform 32 includes one or more open sides, that is, where one or more openings 60 are defined by work platform 32, roof structure 57, and side structures 56, an edge of work platform 32 in each opening 60 can include a guard rail 62 to further enhance safety for personnel using the mobile work station. Where a side structure includes one or more guard rails 60, at least one of the guard rails can be a lowerable sash-type guard rail.

Alternatively, or in addition, any opening 62 as defined above can include padding 64 disposed around some or all of a circumference 66 of opening 62. Such padding may be attached to top rails 68 of guard rails 62, and/or the vertical edges 70 of each side structure 56, and/or to side edges 72 of roof structure 57. Such padding can mitigate incidental damage that might occur if a portion of aircraft 26 projects into the mobile work station 30 via an opening 60, and one or the other of the aircraft and the mobile work station is inadvertently or prematurely moved, creating contact between mobile work station 30 and aircraft 26.

Mobile work station 30 can be configured so that some or all of the work station can intrude into a Class I, Division I hazardous location. For example, mobile work station 30 can be constructed substantially or entirely of non-sparking materials, such as copper-aluminum alloys, stainless steel, silver, aluminum, and galvanized steel, among others. Alternatively or in addition, mobile work station can be constructed so that a gap 73 exists between work platform 32 and each side structure 56, in order to prevent heavier-than-air flammable vapors from accumulating on the work platform.

Mobile work station 30 can additionally include one or more electrical power supplies 74 and electrical systems to enable illumination and/or to provide electricity to powered tools that may be used on work platform 32. Every component of power supply 74 and any associated electrical systems can be explosion-proof, consistent with use in a Class I, Division I hazardous location, including but not limited to pushbuttons, switches, indicator lights, illumination lighting 75, and the like. Where illumination lighting 75 is present, the lighting is typically LED-based.

The one or more electrical power supplies 74 and electrical systems can be supplied from an external power source via cabling, or can be supplied from one or more generators or batteries incorporated into mobile work station 30.

One or more mobile work stations 30 can be utilized as permanent components of an airfield or aircraft service area. Alternatively or in addition, mobile work station 30 can be shipped where it is needed, for example by placing it into either a purpose-built shipping container or a standardized shipping container. Mobile work station 30 can be modified to enhance the transportability of the work station by partially collapsing the mobile work station and/or by disassembling the mobile work station to a lesser or greater extent. For example, side structures 56 and roof structure 57 can be configured to be capable of folding down to lie substantially flat on work platform 32. Alternatively, or in addition, mobile work station 30 can be configured so that work platform 32 can be detached from moveable base 34, so that the two components can be shipped separately, among other configurations.

FIGS. 7-10 depict an illustrative aircraft maintenance procedure that includes installation of a new wingtip, showing how a system that includes mobile work station 30 can facilitate this and similar procedures.

Figure 7:
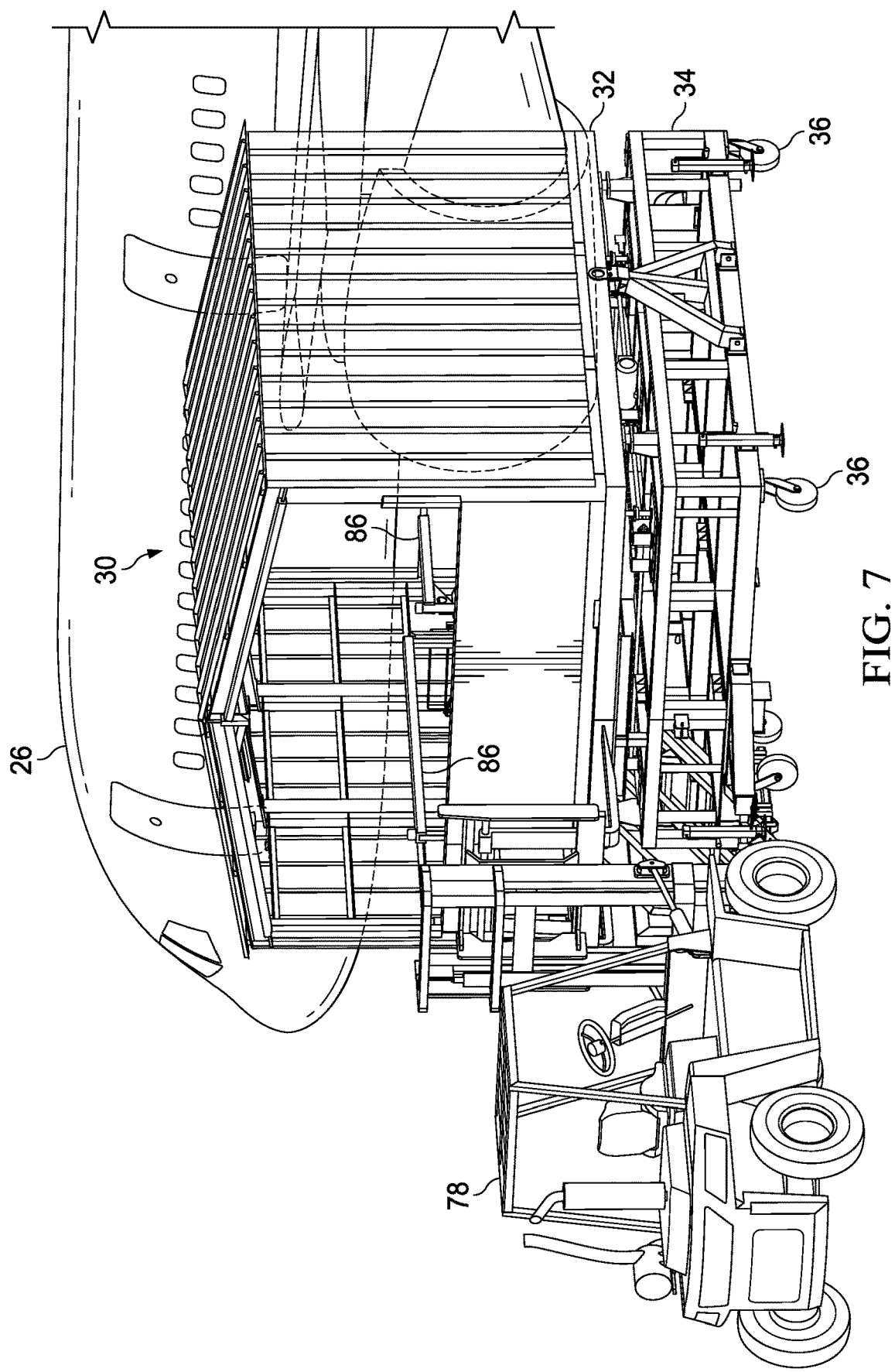
FIG. 7 depicts the mobile work station of FIG. 2 after it has been positioned adjacent an aircraft.

FIG. 7 depicts mobile work station 30 after it has been positioned adjacent aircraft 26, as shown at step 12 of flowchart 10. Mobile work station 30 can be towed or positioned on wheels 36 by coupling to and moving mobile work station via deployable hitch 37. Alternatively, where one or more wheels 36 are powered by drive mechanism 38, mobile work station can be self-driven to a desired position adjacent aircraft 26.

Once mobile work station 30 has been positioned adjacent aircraft 26, the mobile work station can be stabilized and/or leveled by selectively and adjustably deploying the one or more jack stands 40, as shown at step 14 of flowchart 10.

Figure 8:
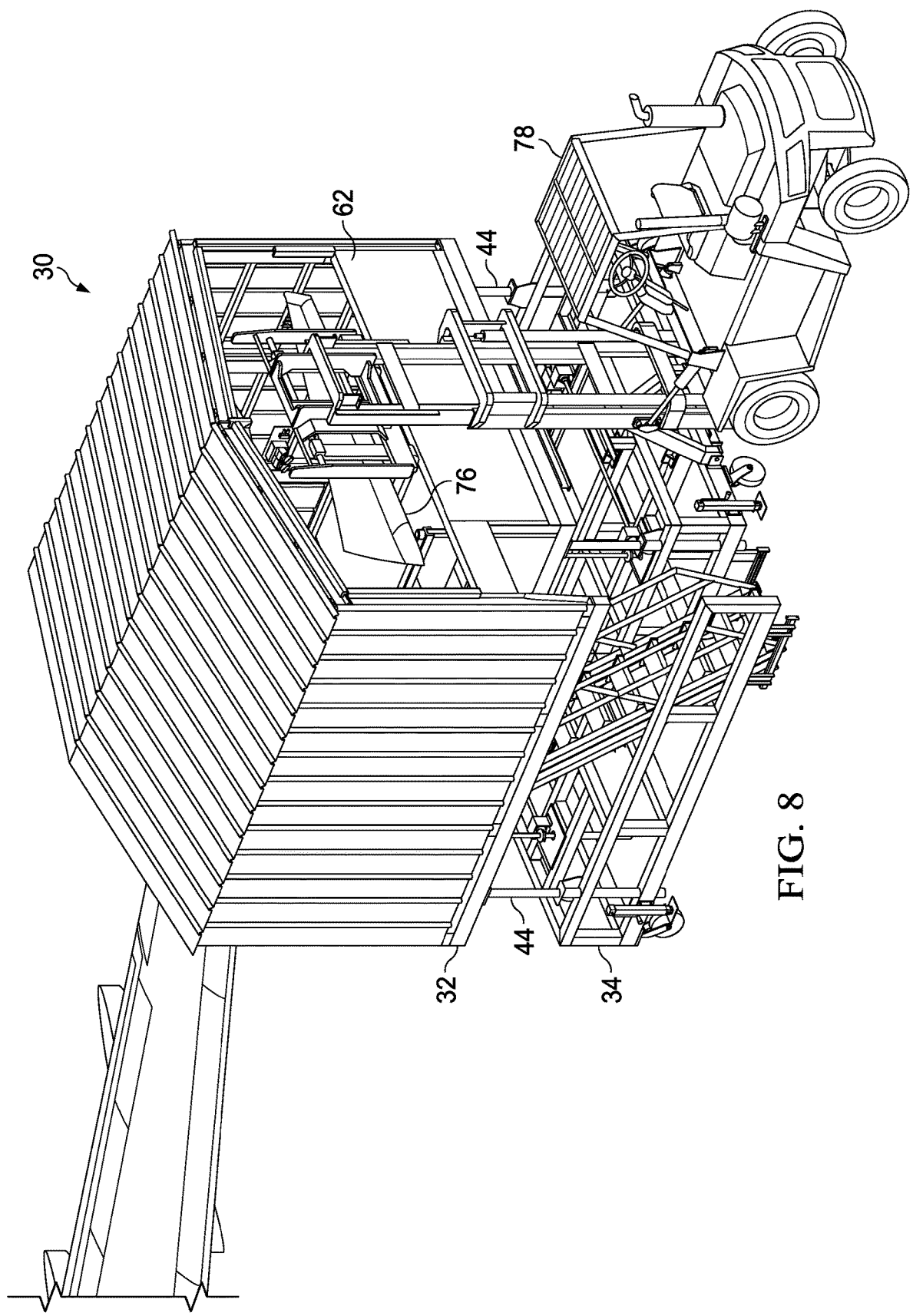
FIG. 8 depicts an illustrative aircraft component being transferred to the mobile work station of FIG. 7 adjacent the aircraft.

FIG. 8 depicts a transfer of an aircraft component 76 to workspace 55 of mobile work station 30, where aircraft component 76 will be needed for a subsequent repair, service, or modification of aircraft 26. Aircraft component 76 can be placed in workspace 55 by any appropriate handling equipment, but use of a forklift 78, as shown, can be particularly useful as the forklift can readily raise desired tools and components over guard rail 62 of work platform 32.

Figure 9:
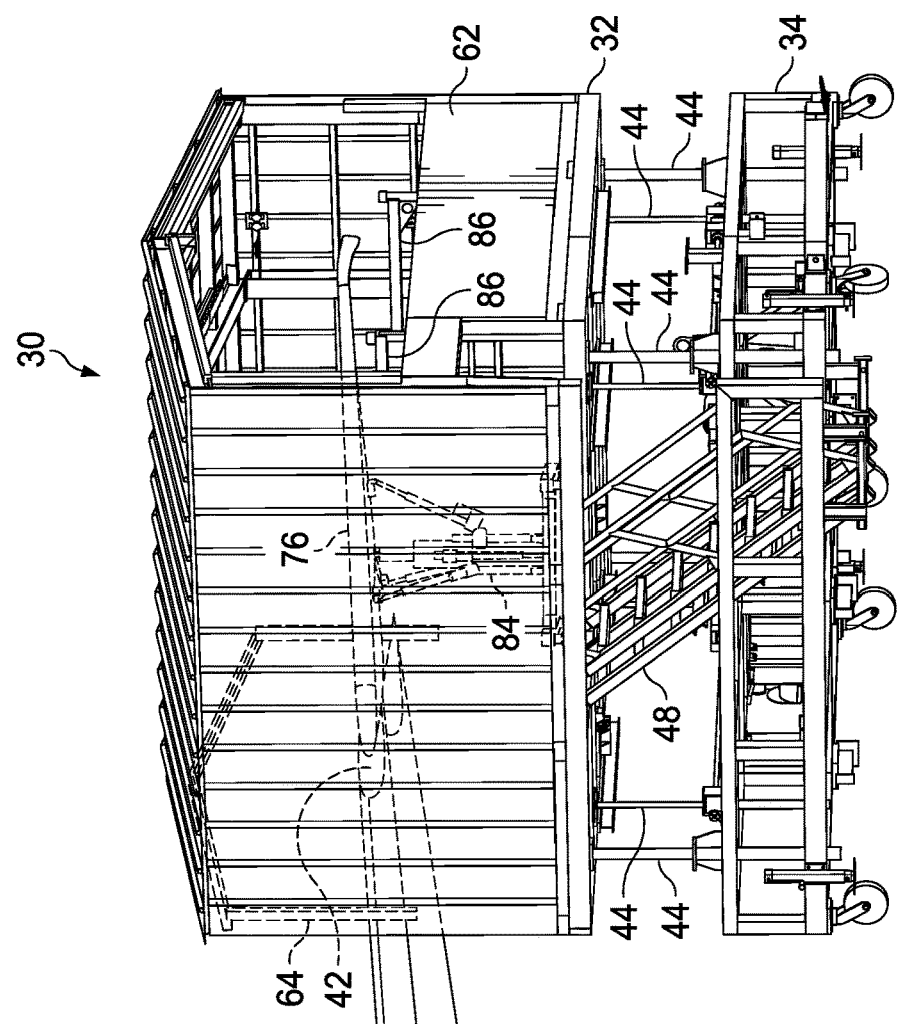
FIG. 9 depicts the work platform of the mobile work station of FIG. 7 after it has been aligned with the outboard end portion of the port wing of the aircraft.

As shown in FIG. 9, mobile work station 30 has been aligned with the exterior structure 42 of aircraft 26 that is to be serviced or maintained, as shown at step 16 of flowchart 10. In this example, exterior structure 42 includes the outboard end portion 80 of the port wing of aircraft 26, and the service or maintenance to be performed is the installation of a component 76 that is a raked wingtip 82. By aligning the work platform is meant that the height of work platform 32 can be adjustably raised and lowered using platform jacks 44 so as to position work platform 32 at a substantially optimal position to enable personnel on work platform 32 to comfortably and safely perform the desired service or maintenance.

Figure 10:
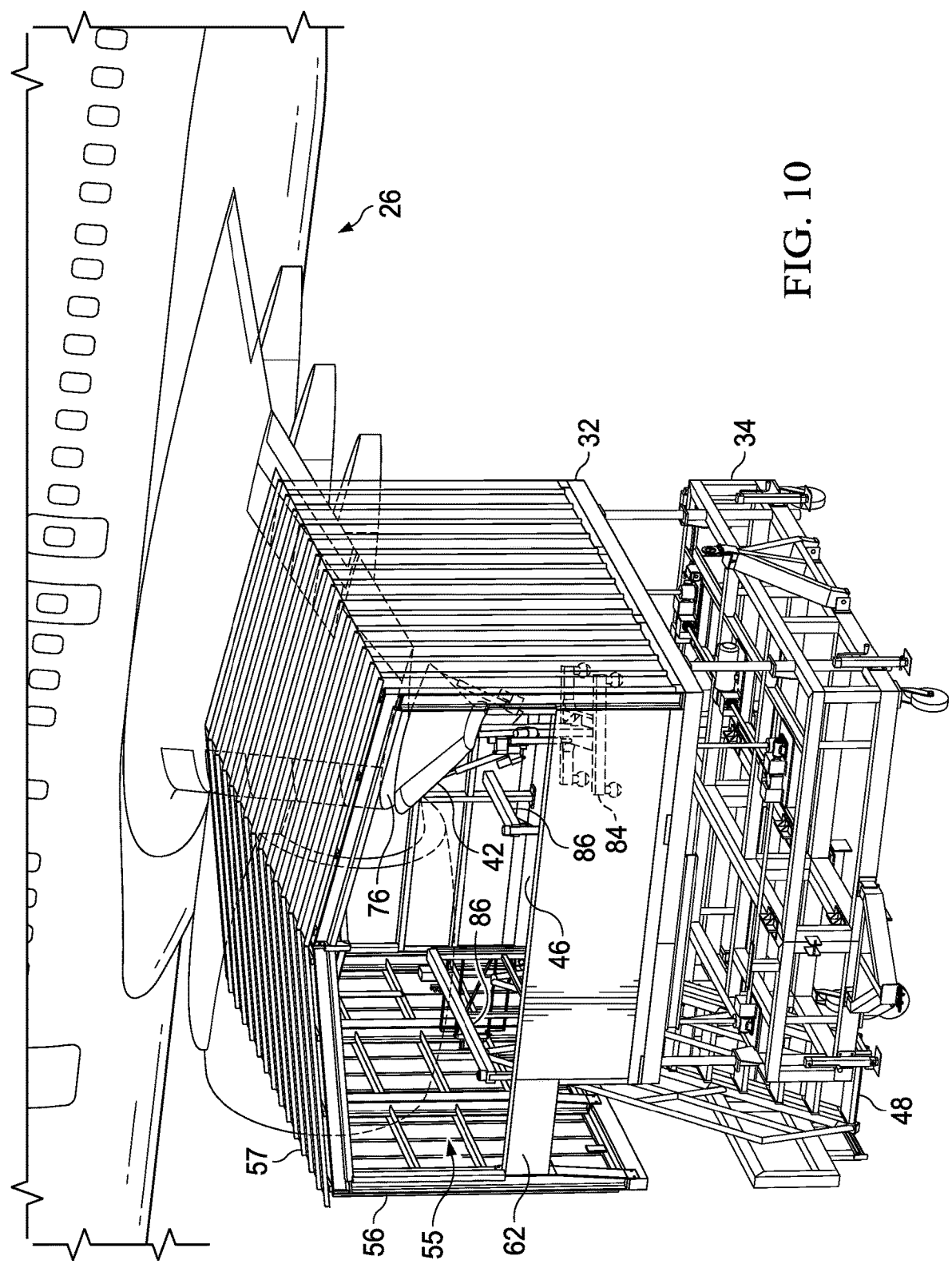
FIG. 10 depicts the mobile work station of FIG. 9 from an alternative viewpoint.

As shown in FIG. 10, raked wingtip 82 has been carefully aligned with outboard end portion 80 of aircraft 26, permitting the desired maintenance on the exterior structure 42 of aircraft 26 to be performed from work platform 32, as shown at step 18 of flowchart 10. In particular, by virtue of the proper height and alignment work platform 32 wingtip 82 can be secured to aircraft 26 by inserting temporary pins into each of the appropriate fastener apertures in wingtip 82 and corresponding apertures in outboard end portion 80 of the wing until wingtip 82 is properly positioned, whereupon the temporary pins can be replaced by the desired fasteners.

This type of service or maintenance can be further facilitated by using an adjustable work stand 84 in combination with mobile work station 30. For example as shown in FIGS. 9 and 10, raked wingtip 81 can be disposed on an adjustable work stand that can be configured to adjustably support raked wingtip 81. By adjusting work stand 84, alignment of wingtip 82 with outboard end portion 80 can be achieved more rapidly, with greater precision, and with greater safety than was possible using previous methodologies. Work stand 84 can be configured to be fully adjustable along three axes, including variable pitch and yaw. Work stand 84 can include a support, or cradle, that is configured to be complementary to a specific aircraft component, such as raked wingtip 81, or the support or cradle can be designed to support a variety of types of individual aircraft components.

It may be additionally advantageous for work platform 32 to include a plurality of loading arms 86, disposed adjacent a lower edge of opening 60 and configured to receive aircraft component 76 from forklift 78. Loading arms 86 can have any configuration that is capable of stably supporting aircraft component 76 after it is transferred to work platform 32, and before aircraft component 76 is transferred to adjustable work stand 84. In particular, loading arms 86 can have the form of two or more horizontal beams, as shown in FIGS. 6, 7, 9, and 10.

Once the desired service or maintenance has been performed, work platform 32 can be lowered using platform jacks 44, and mobile work station 30 can be moved away from aircraft 26 on wheels 36, although not necessarily in that order, as shown in steps 20 and 21 of flowchart 10.

(4) Illustrative Combinations and Additional Examples

This section describes additional aspects and features of the disclosed methods of performing assembly or maintenance, systems for performing assembly or maintenance and mobile work stations, presented without limitation as a series of paragraphs, some or all of which can be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A method of performing desired assembly or maintenance on an aircraft, comprising: positioning a mobile work station adjacent the aircraft, where the mobile work station includes a work platform including an accessway providing access to the work platform; and a base supporting the work platform with one or more platform jacks that can adjustably raise and lower the work platform, and including a plurality of wheels that permit the mobile work station to be positioned adjacent the aircraft; stabilizing and/or leveling the mobile work station by deploying one or more jack stands of the wheeled base; aligning the work platform with an exterior structure to be serviced on the aircraft with the one or more platform jacks; performing the desired maintenance on the exterior structure to be serviced from the work platform; moving the mobile work station away from the aircraft; and lowering the work platform on the base using the one or more platform jacks.

A2. The method of paragraph A1, where positioning the mobile work station includes positioning a mobile work station that includes an accessway that is a stair, a lift, or a ramp.

A3. The method of paragraph A1, where performing the desired assembly or maintenance includes accessing the work platform via an accessway that includes a self-leveling access stair, the access stair having a lower end that remains within a footprint of the base when the work platform is lowered.

A4. The method of paragraph A1, where performing the desired assembly or maintenance includes the use of one or more electrical power supplies incorporated in the mobile work station.

A5. The method of paragraph A1, where the work platform is at least partially enclosed by at least one side structure and a roof structure coupled to the at least one side structure; such that the work platform, the at least one side structure, and the roof structure define a workspace that is accessible via the accessway.

A6. The method of paragraph A5, where performing the desired assembly or maintenance includes performing the desired assembly or maintenance within the workspace, where the workspace provides at least some shelter from sun and/or rain and obscures observation of the desired assembly or maintenance being performed.

A7. The method of paragraph A1, where aligning the work platform with an exterior structure to be serviced on the aircraft includes aligning the work platform with an outboard end portion of a wing of the aircraft.

A8. The method of paragraph A7, where performing the desired assembly or maintenance on the outboard end portion of the wing of the aircraft includes installing a wing tip on the outboard end portion of the wing.

B1. A system for performing assembly or maintenance on an aircraft, comprising: a mobile work station; the mobile work station including a work platform including an accessway providing access to the work platform; and a wheeled base supporting the work platform with one or more platform jacks that can adjustably raise and lower the work platform.

B2. The system of paragraph B1, where one or more sides of the work platform includes guard rails.

B3. The system of paragraph B2, where at least one of the guard rails is a lowerable sash-type guard rail.

B4. The system of paragraph B1, where the work platform is at least partially enclosed.

B5. The system of paragraph B1, where the work platform is at least partially enclosed by at least one side structure and a roof structure coupled to the at least one side structure.

B6. The system of paragraph B1, where the wheeled base includes a drive system for driving one or more wheels of the wheeled base.

B7. The system of paragraph B1, where the one or more platform jacks are independently mechanical jacks, hydraulic jacks, or pneumatic jacks.

B8. The system of paragraph B1, where the wheeled base further includes a plurality of jack stands configured to level and/or stabilize the mobile work station.

B9. The system of paragraph B1, where the accessway includes a self-leveling stair.

B10. The system of paragraph B9, where a lower end of the self-leveling stair remains within a footprint of the wheeled base when the work platform is lowered.

B11. The system of paragraph B1, where the mobile work station includes a gap between the work platform and each side structure.

B12. The system of paragraph B1, where the mobile work station includes one or more electrical power supplies.

B13. The system of paragraph B1, where the mobile work station is comprised of non-sparking materials.

C1. A mobile work station, including: a work platform including a self-leveling access stair; where the work platform includes a side structure on each of two opposing sides of the work platform, and a roof structure coupled to each of the two side structures, and lowerable guard rails on each of the two opposing open sides; and a wheeled base supporting the work platform with one or more platform jacks to adjustably raise and lower the work platform; and one or more jack stands to level and/or stabilize the mobile work station by leveling and/or stabilizing the wheeled base.

C2. The mobile work station of paragraph C1, where the one or more platform jacks and the one or more jack stands are independently mechanical jacks, pneumatic jacks, or hydraulic jacks.

C3. The mobile work station of paragraph C1, where each opening formed by the work platform, the roof structure, the two side structures, and a guard rail includes padding around a circumference of the opening.

C4. The mobile work station of paragraph C1, further comprising a gap for venting heavy vapors substantially around a circumference of the work platform.

C5. The mobile work station of paragraph C1, further comprising an adjustable work stand, disposed upon the work platform, and configured to support a selected aircraft component.

C6. The mobile work station of paragraph C1, where an opening formed by the work platform, the roof structure, and two side structures a plurality of loading arms adjacent a lower edge of the opening and configured to receive an aircraft component that is delivered through the opening by a forklift.

C7. The mobile work station of paragraph C1, where the mobile work station is configured to either partially collapse, to be at least partially disassembled, or both in order to enhance transportability of the mobile work station.

(5) Advantages, Features, and Benefits

The methods of performing assembly or maintenance, systems for performing assembly or maintenance and mobile work stations disclosed herein provide significant benefits when compared to prior methods and systems for performing assembly or maintenance on the external surfaces of aircraft.

Conventional aircraft service methods have relied upon fixed hangers to provide shelter from sun and weather, as well as to house overhead cranes, which have traditionally been used in assembly or service of aircraft. The need for hangers has created bottlenecks in service where available hanger space may be limited, or more troublesome, where no hangers exist. The methods and systems described herein permit even challenging service procedures to be carried out in safety and shelter, without requiring access to an enclosed hanger.

The disclosed methods additionally offer substantial improvements in safety, as the movement of heavy aircraft components overhead with cranes creates inherent safety issues, both from having personnel straying beneath a suspended load, and the risk of pinching or crushing due to a swaying component. Using the presently described systems, such heavy components are fully supported at all times, and can be positioned accurately without risk of pinching.

Furthermore, placing personnel within a partially enclosed workspace, one that is fitted with safety rails, provides much greater safety than having workers standing or crouching on the surface of a wing, or perched in an aerial work platform such as a scissor lift or cherry-picker, where the risk of falling is substantially greater.

The presently described methods of assembly or maintenance, systems of assembly or maintenance, and mobile work stations offer dramatically increased flexibility in conducting aircraft service and maintenance operations, not only in how such operations can be conducted, but in where they can be conducted. In addition, the work can be performed more quickly, at higher quality, and with greater safety than can be achieved with current methods.

(6) Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of performing desired assembly or maintenance on an aircraft, comprising:
   positioning a mobile work station adjacent the aircraft, where the mobile work station includes
      a work platform including an accessway providing access to the work platform; and
      a base supporting the work platform with one or more platform jacks that can adjustably raise and lower the work platform, and including a plurality of wheels that permit the mobile work station to be positioned adjacent the aircraft;
   stabilizing and/or leveling the mobile work station by deploying one or more jack stands of the wheeled base;
   aligning the work platform with an exterior structure to be serviced on the aircraft with the one or more platform jacks;
   performing the desired assembly or maintenance on the exterior structure to be serviced from the work platform;
   moving the mobile work station away from the aircraft; and
      lowering the work platform on the base using the one or more platform jacks, wherein the accessway includes a fixed length non-extensible stairway connecting the wheeled base to the work platform.

2. The method of claim 1, where positioning the mobile work station includes positioning the mobile work station that includes the accessway that is a stair, a lift, or a ramp.

3. The method of claim 1, wherein performing the desired assembly or maintenance includes accessing the work platform via the accessway that includes a self-leveling access stair, the access stair having a lower end that remains within a footprint of the base when the work platform is lowered.

4. The method of claim 1, wherein the work platform is at least partially enclosed by at least one side structure and a roof structure coupled to the at least one side structure; such that the work platform, the at least one side structure, and the roof structure define a workspace that is accessible via the accessway.

5. The method of claim 4, wherein performing the desired assembly or maintenance includes performing the desired assembly or maintenance within the workspace, where the workspace provides at least some shelter from sun and/or rain and obscures observation of the desired assembly or maintenance being performed.

6. The method of claim 1, wherein aligning the work platform with an exterior structure to be serviced on the aircraft includes aligning the work platform with an outboard end portion of a wing of the aircraft; and performing the desired assembly or maintenance on the outboard end portion of the wing of the aircraft includes installing a wing tip on the outboard end portion of the wing.

7. A system for performing assembly or maintenance on an aircraft, comprising:
   a mobile work station; the mobile work station including
      a work platform including an accessway providing access to the work platform; and
      a wheeled base supporting the work platform with one or more platform jacks that can adjustably raise and lower the work platform, wherein the accessway includes a fixed length non-extensible stairway connecting the wheeled base to the work platform.

8. The system of claim 7, wherein one or more sides of the work platform includes guard rails, and at least one guard rail is a lowerable sash-type guard rail.

9. The system of claim 7, wherein the work platform is at least partially enclosed by at least one side structure and a roof structure coupled to the at least one side structure.

10. The system of claim 7, wherein the wheeled base includes a drive system for driving one or more wheels of the wheeled base.

11. The system of claim 7, wherein the one or more platform jacks are independently mechanical jacks, hydraulic jacks, or pneumatic jacks.

12. The system of claim 7, wherein the accessway includes a self-leveling stair that is configured so that a lower end of the self-leveling stair remains within a footprint of the wheeled base when the work platform is lowered.

13. The system of claim 7, wherein the mobile work station is configured to be used within a Class 1, Division 1 environment.

14. A mobile work station, including:
   a work platform including a self-leveling access stair; wherein the work platform includes a side structure on each of two opposing sides of the work platform, and a roof structure coupled to each of the two side structures, and lowerable guard rails on each of two opposing open sides;
   a wheeled base supporting the work platform with one or more platform jacks to adjustably raise and lower the work platform; and one or more jack stands to level and/or stabilize the mobile work station by leveling and/or stabilizing the wheeled base; and
   an adjustable work stand, disposed upon the work platform, and configured to support a selected aircraft component.

15. The mobile work station of claim 14, wherein the one or more platform jacks and the one or more jack stands are independently mechanical jacks, pneumatic jacks, or hydraulic jacks.

16. The mobile work station of claim 14, wherein each opening formed by the work platform, the roof structure, the two side structures, and a guard rail includes padding around a circumference of the opening.

17. A mobile work station, including:
   a work platform including a self-leveling access stair; wherein the work platform includes a side structure on each of two opposing sides of the work platform, and a roof structure coupled to each of the two side structures, and lowerable guard rails on each of two opposing open sides;

a wheeled base supporting the work platform with one or more platform jacks to adjustably raise and lower the work platform; and one or more jack stands to level and/or stabilize the mobile work station by leveling and/or stabilizing the wheeled base; and a plurality of loading arms adjacent a lower edge of an opening formed by the work platform, the roof structure, and two side structures, the plurality of loading arms being configured to receive an aircraft component that is delivered through the opening by a forklift.

18. The mobile work station of claim 14, wherein the mobile work station is configured to be either partially collapsed, to be at least partially disassembled, or both, in order to enhance transportability of the mobile work station.

19. The system of claim 7, wherein an angle of the stairway relative to the work platform or wheeled base changes as the work platform is raised or lowered relative to the wheeled base.

20. The system of claim 7, wherein a lower end of the stairway moves inward, and away from a perimeter of the wheeled base as the work platform is raised relative to the wheeled base.

21. The system of claim 7, wherein the stairway includes at least one guardrail running along a side of the stairway, and extends along a length of the stairway.

22. A system for performing assembly or maintenance on an aircraft, comprising:

a mobile work station; the mobile work station including a work platform including an accessway and access stair providing access to the work platform and lowerable guard rails on each of two opposing open sides of the work platform;

a wheeled base supporting the work platform with one or more platform jacks that can adjustably raise and lower the work platform, and an adjustable work stand, disposed upon the work platform, and configured to support a selected aircraft component.

* * * * *